US009577996B2

(12) United States Patent
Heinrich et al.

(10) Patent No.: US 9,577,996 B2
(45) Date of Patent: Feb. 21, 2017

(54) COMPUTER SYSTEM AND METHOD FOR ENCRYPTED REMOTE STORAGE

(71) Applicant: Pentland Firth Software GmbH, München (DE)

(72) Inventors: Frank Heinrich, München (DE); Durim Morina, München (DE)

(73) Assignee: Pentland Firth Software GmbH, Munich (DE)

( * ) Notice: Subject to any disclaimer, the term of this patent is extended or adjusted under 35 U.S.C. 154(b) by 0 days.

(21) Appl. No.: 14/473,239

(22) Filed: Aug. 29, 2014

(65) Prior Publication Data

US 2016/0065547 A1    Mar. 3, 2016

(51) Int. Cl.
| | |
|---|---|
| H04L 29/06 | (2006.01) |
| H04L 29/08 | (2006.01) |
| G06F 21/62 | (2013.01) |
| H04L 9/06 | (2006.01) |
| G06F 17/30 | (2006.01) |

(52) U.S. Cl.
CPC ....... *H04L 63/061* (2013.01); *G06F 17/30091* (2013.01); *G06F 21/6218* (2013.01); *G06F 21/6272* (2013.01); *H04L 9/0618* (2013.01); *H04L 63/0428* (2013.01); *H04L 67/1097* (2013.01); *G06F 2212/263* (2013.01)

(58) Field of Classification Search
CPC .................................................. H04L 63/0428
USPC ........................................................ 713/162
See application file for complete search history.

(56) References Cited

U.S. PATENT DOCUMENTS

| | | | | |
|---|---|---|---|---|
| 2003/0005321 A1* | 1/2003 | Fujioka | ...................... | G06F 7/38 713/193 |
| 2006/0271688 A1* | 11/2006 | Viger | .................... | H04L 63/101 709/227 |
| 2009/0177894 A1* | 7/2009 | Orsini | ................. | G06F 21/6209 713/193 |

(Continued)

FOREIGN PATENT DOCUMENTS

CA    2839081 A1    7/2014

OTHER PUBLICATIONS

Sage A Weil, "CEPH: Reliable, Scalable, and High-Performance Distributed Storage", Dissertation, Dec. 2007, 239 pages, University of California, Santa Cruz, U.S.A.

(Continued)

*Primary Examiner* — Teshome Hailu
(74) *Attorney, Agent, or Firm* — Moser Taboada (57) ABSTRACT

A method for remotely storing data is provided. The method comprises providing a first data file on a client computer; splitting, on the client computer, the first data file into at least two partial files; encrypting the at least two partial files with an encryption algorithm; distributing the at least two encrypted partial files in at least two remote storage locations; storing information about the at least two storage locations of the at least two encrypted partial files for a later retrieval of the at least two encrypted partial files; and storing decryption information for the decryption of the at least two encrypted partial files on the client computer. Further, a computer software product adapted for executing, when run on a computer, a method for remotely storing data is provided, and a client computer for executing the method for remotely storing data.

18 Claims, 3 Drawing Sheets

(56) References Cited

U.S. PATENT DOCUMENTS

| | | | |
|---|---|---|---|
| 2010/0162001 A1* | 6/2010 | Dodgson | G06F 17/302 713/193 |
| 2010/0162003 A1* | 6/2010 | Dodgson | G06F 11/1456 713/193 |
| 2010/0162004 A1* | 6/2010 | Dodgson | H04L 9/0894 713/193 |
| 2013/0166510 A1* | 6/2013 | Augenstein | G06F 11/1453 707/640 |
| 2014/0173272 A1 | 6/2014 | Kim | |

OTHER PUBLICATIONS

Zooko Wilcox-O'Hearn, et al., "Tahoe—The Least-Authority Filesystem", *StorageSS'08*, Oct. 31, 2008, 6 pages, Fairfax, Virginia, U.S.A.

* cited by examiner

COMPUTER SYSTEM AND METHOD FOR ENCRYPTED REMOTE STORAGE

TECHNICAL BACKGROUND

The subject matter described herein relates generally to systems, methods, and computer-readable media for remote data storage, and more particularly, to systems, methods, and computer-readable media for encrypted remote data storage carried out from a computer system, even more particularly from a client computer.

In recent years, providers of online storage accessible over the internet, also called remote storage providers or online storage providers, have been very successful both in the consumer market and in the corporate market. An example of the services provided are simple, easy-to-use backup and/or storage services that predominantly target the consumer segment, also called "cloud" services. Examples for such services are Dropbox, Onedrive offered by Microsoft, and Drive offered by Google. These services offer ease of use, simple and relatively similar user interfaces, online/offline content synchronization, and pricing plans. However, the offered convenience comes at a cost—users must leave the supervision over their files to the service provider, leaving the security and integrity of the files in the hands of the vendor. As the user uploads his files to the service provider of choice, he loses control over the security of his data and has to rely on the integrity and ability of the service provider to safeguard his files. This leaves room for improvement, as it would be desirable to not have to rely on trust and good faith only.

In the cases above, the user has no influence or control what the company actually does with his data, at which geographical locations and in which countries the data is stored, or which safety mechanisms and standards are employed against data loss, manipulation and intrusion, etc. To sum up, the user is entirely dependent on at least one third party, namely the service provider, but also on his internet service provider to take good care of his data. In particular with sensitive personal data, financially relevant data or other sensitive information like business information or financial account data, this trust-based approach is not satisfactory with respect to a number of aspects and leaves room for improvements.

As long as the user's data to be stored, embodied as files, is stored in a plain, non-encrypted format, there are plenty of risks in that an unauthorized intruder might gain access to the stored data, which is generally known as computer related crime or computer crime. Therefore, it has become good practice, which is nevertheless followed only by a minority of the providers of remote storage services, to encrypt the customer data prior to storing it on a storage facility of the service provider. However, this method also has a number of drawbacks and potential risks for customers, be it consumers or corporate customers: Even if the customer's data is stored in an encrypted form at a facility of the service provider—that is, when the data is stored in a scrambled, non-readable form and is only readable with the knowledge of the employed encryption method and, for example, an encryption key—intruders may for example gain electronic access to a location of a company's storage network where the cryptographic information needed for accessing the data is stored. Also, even employees of the service provider might behave inappropriately and thus gain access to the customer's data. Thus, it is desirable to have a method for securely storing data remotely, without the potential for intrusion or data theft by an unauthorized private individual or other instance.

Furthermore, it has become common knowledge that government agencies in various countries have more or less direct access to the data of major companies, in most cases on a legal basis. This pertains to hardware and software companies, and also to storage service providers. Further, it is known that a significant part of the internet traffic is monitored on a regular basis, or in some cases even nearly continuously, by the authorities in a number of countries. Consequently, storage service providers may be able to protect files belonging to their customers from ordinary attackers, but may for example be obliged by law to collaborate with government agencies to give them access to the data—even full access to originally encrypted data—that users have stored with their storage services.

This is particularly relevant as in today's globalized economy embodied in the internet, no one person can be sure which governments might want access to his data. For example, an American citizen might store his data with a company which operates data storage centers physically located in various other countries, e.g., for economic, tax or other business related reasons. At least one of these countries might grant access via covert cooperation—probably unknown to the public, regardless in which country—to its own government's authorities or even to the authorities of a yet further foreign country. This might result in the authorities of a country hardly known to the private or even corporate US customer having full access to his sensitive personal or business related files. That data might in turn, for example, even contain information relevant to the security of the US or be potentially damaging to the business interests of US companies, such as to the employer of the individual using the storage service, or directly to a private business using the storage service. Thus, it would be desirable to have a method for securely storing data remotely which offers enhanced security against intrusion or manipulation by, for example, cryptographic attacks or the well-known "social engineering" attacks used by professional attackers against individuals and companies.

One approach for safeguarding the privacy of personal or business data against the above cited and other risks is to locally encrypt files on the user's computer (client computer) before transferring them to an online storage provider over the internet. Such a service is, for example, provided by the German company boxcryptor.de. However, also this method leaves room for improvement. For example, it is typically only a question of time until a known encryption algorithm will be broken, for example by specialized branches of government agencies which are known to take such action, and it may be years before such a security breach becomes public knowledge. Thus, in the meantime, the authorities of various countries might continuously inspect the encrypted personal or business data remotely stored, which is falsely considered to be safely encrypted by both the customer and even by the respective storage service provider. Also, the described method for the file encryption prior to the upload also prohibits users from benefiting from one of the desirable useful effects of storing files online, that is to easily and conveniently share personal files, such as photographs and the like, with friends, family or coworkers.

Hence, it would be desirable to have methods, systems or services for the remote storage of data which provide enhanced safety against a great number of attacks and against any kind of attacker, while at the same time providing ease of use and at least some or all of the advantages for users known from remote online storage services.

For the reasons cited above and for other reasons, there is a need for the present invention.

BRIEF DESCRIPTION OF THE INVENTION

In view of the above, a method, one or more computer readable media, and a computer system for remotely storing data are provided.

In one aspect, a method for remotely storing data is provided. The method comprises providing a first data file on a client computer; splitting, on the client computer, the first data file into at least two partial files; encrypting the at least two partial files with an encryption algorithm; distributing the at least two encrypted partial files in at least two remote storage locations; storing information about the at least two storage locations of the at least two encrypted partial files for a later retrieval of the at least two encrypted partial files; and storing decryption information for the decryption of the at least two encrypted partial files on the client computer.

In a further aspect, a computer software product adapted for executing, when run on a computer, a method for remotely storing data is provided. The method comprises providing a first data file on a client computer; splitting, on the client computer, the first data file into at least two partial files; encrypting the at least two partial files with an encryption algorithm; distributing the at least two encrypted partial files in at least two remote storage locations; storing information about the at least two storage locations of the at least two encrypted partial files for a later retrieval of the at least two encrypted partial files; and storing decryption information for the decryption of the at least two encrypted partial files on the client computer.

In a yet further aspect, a computer system for remotely storing data is provided. The computer system comprises a client computer, comprising a central processing unit, a storage device, a device for inputting data by a user, and a network adapter for connecting the client computer to a network, a software for the distributed and encrypted storage of data over a network in at least two remote storage locations, wherein the software is executable on the client computer and comprises processes for splitting, on the client computer, a first data file to be stored into at least two partial data files, encrypting the at least two partial data files with an encryption algorithm, distributing the at least two partial data files over at least two remote storage locations connected over a network, storing information, on the client computer, about the at least two storage locations of the at least two partial files for a later retrieval of the at least two partial files, storing decryption information, on the client computer, for the decryption of the at least two partial files.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations. The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

The embodiments described herein include a method, a computer system and computer readable media storing computer executable instructions that, when executed on a processor, perform that method, which provide remote storage of user data with enhanced security. More specifically, this is achieved while providing ease of use, a high level of security against data loss, and the possibility for a user to influence the level of security with which his data is stored.

As used herein, the term "network" is intended to mean a computer network or data network, which is a telecommunications network that allows computers to exchange data. In computer networks, networked computing devices pass data to each other along data connections. The connection nodes are established using either cable media or wireless media. The best-known computer network is the Internet. Network computer devices that originate, route and terminate the transmitted data are called network nodes. Nodes can include "hosts" such as personal computers, mobile phones, servers, as well as networking hardware. Two such devices are said to be networked together when one device is able to exchange information with the other device, whether or not they have a direct connection to each other. In general, networks support applications such as access of an individual with his client computer to the World Wide Web, shared use of application and storage servers, printers, and fax machines, and use of email and instant messaging applications. Networks differ in the physical media used to transmit their signals, the communications protocols to organize network traffic, the network's size, topology and organizational intent.

As used herein, the term "client computer" is intended to be representative of a standalone computer for use by an individual, such as the typical personal computers used in private households, or the computers used by employees at their workplace in companies. Subtypes of client computers are, for example, personal computers (PC), home computers, and microcomputers. Also portable devices, such as tablet computers, mobile phones with built-in computing devices (known as smartphones) which are used by individuals are regarded as client computers herein.

As used herein, the terms "storage medium" or "computer readable media" are intended to mean physical devices for the storage of digital data. They include technology comprising computer components and/or recording media which are used to retain digital data, also called information. Typical computer readable media are, as non-limiting examples, hard discs, optical discs such as CD ROMs and DVDs, diskettes, memory cards such as SD cards or compact flash cards, and USB memory sticks.

As used herein, "Cryptography" is intended to mean the practice and study of techniques for secure communication in the presence of third parties, which are sometimes called adversaries, in the following also called "attackers" and "intruders". More generally, cryptography is about constructing and analyzing protocols that overcome the influence of adversaries and which are related to various aspects in information security such as data confidentiality, data integrity, authentication, and non-repudiation. Modern cryptography is heavily based on mathematical theory and computer science practice; cryptographic algorithms are designed around computational hardness assumptions, making such algorithms hard to break in practice by any adversary. It is theoretically possible to break such a system, but this requires efforts which are, if at all, only infeasible for very large institutions such as states. These schemes are therefore termed computationally secure; theoretical advances, e.g., improvements in integer factorization algorithms, and faster computing technology require these solutions to be continually adapted. In practical use and as used herein, "cryptography" refers to encryption, which is the process of converting ordinary information (called plaintext) into unintelligible text (called ciphertext). Decryption is the reverse, in other words, moving from the unintelligible ciphertext back to plaintext.

A "cipher" (or cypher), as used herein, is a pair of algorithms that create the encryption and the reversing decryption. The detailed operation of a cipher is controlled both by the algorithm and in each instance by a "key". This is a secret (ideally known only to the communicants), usually a short string of characters, which is needed to decrypt the ciphertext. As used herein, the key is originally only known to the user which encrypts and uploads his files to an online storage provider.

As used herein, "cryptanalysis" is the term used for the study of methods for obtaining the meaning of encrypted information without access to the key normally required to do so; i.e., it is the study of how to crack encryption algorithms or their implementations. Some use the terms cryptography and cryptology interchangeably in English, while others (including US military practice generally) use cryptography to refer specifically to the use and practice of cryptographic techniques and cryptology to refer to the combined study of cryptography and cryptanalysis.

As used herein, the plaintext or ordinary information, as cited above, stands for the original file of a user which he intends to encrypt. After encryption, the encrypted file has the form of the unintelligible text (ciphertext). The original, unencrypted file can only be retrieved from that file by decryption of the encrypted file, typically by using the key only known to the user.

As used herein, a "file hosting service", "cloud storage service", "online file storage provider", "remote storage service", "remote storage" or "cyberlocker" is an Internet hosting service specifically designed to host user files, also called user data. It allows users to upload files from their client computer, which can then be accessed over the internet from the same or from a different computer, tablet, smart phone or other networked device, by the same user or possibly by other users, after a password or other authentication is provided. Organizations, such as companies, which provide such services are herein called "online storage providers", "remote storage providers", "cloud storage providers", "storage service providers" or similar.

As used herein, the term "remote storage location" is intended to mean a physical unit other than the client computer of the user, which is suitable for storing data files and is located at a different geographical location than the client computer. It has the potential and may be used by the user for storing data thereon over a network. Typically, the remote storage location comprises at least one server, but may also comprise only a single client computer other than the client computer of the user. The remote storage location typically comprises at least one device for permanently storing data, such as a hard disc (HD), a solid state disc (SSD), or other known storage devices and media. As a non-limiting example, the remote storage location may be a data center comprising a plurality of servers and storage devices which are housed in a building, wherein the storage capacity of this data center is offered by the company owning it to paying customers. The customers may then store their personal files over the internet on the servers and hard discs of the data center, pay for this service and have permanent access over the internet on their stored files. Companies may also run a plurality of such data centers, wherein a customer using a storage service of the company sees and uses only one single point of access, as the data centers are internally coupled by the service provider. This single point of access may for example be an IP address and a port number accessible over a network protocol such as TCP/IP. As such a plurality of data centers run by a remote storage service provider appears logically as one single unit to the user, or to a client computer accessing the service, the storage space provided to a user is also regarded as only one remote storage location in the context of the present disclosure. Another non-limiting example for a remote storage location would be a university server, on which authorized personnel of the university and also students may store files, which is also accessible over the internet. A further example may be a server with a hard disc, wherein the server is part of a wide area network (WAN) or local area network (LAN) run by a company. For a user having a client computer also connected to the same WAN or LAN, this server may serve as a remote storage location for the storage of personal files of the user on a hard disc of the server. Thereby, the user may access the server, that is the remote storage location, over the WAN or LAN without the need of using the internet for this purpose. However, if a user, for example a company employee, has authorized access from the internet to servers inside the WAN or LAN, he can access the same server (remote storage location) also over the internet, and not only using the LAN or WAN as previously described.

Generally, the term remote storage location should be interpreted broadly in the present context as any storage location which is geographically distinct from a client computer of a user, and which is accessible for the client computer of the user over a network such as the internet, a LAN or a WAN. Thereby, the distance needs not be large, for example a remote storage location may be a server which is only 20 meters or 50 meters away from the client computer and is connected to it by a network, which may be the internet, a copper-line based LAN, or even a Wifi network (WLAN). Typically, the distance is however much larger, such as tens, hundreds or thousands of kilometers, and is typically bridged via cables comprising copper or glass fiber.

Generally, the client computer is in embodiments at least temporarily connected to a computer network over a network adapter, and it can communicate over the network with other client computers used by other individuals, or can communicate with at least one server, in particular with at least one server of at least one remote storage service provider. Typically, but not necessarily, the term "network" as used herein is intended to mean the internet. It can also mean, for example, a local area network (LAN) or a wide area network (WAN) as used by companies, which may connect a larger number of client computers and also servers, which can in the case of the WAN be distributed over a larger geographical area or across borders. The LAN or WAN provides restricted, limited access for users from outside the instance or company running the network to client computers and servers connected by the network. Such a LAN or WAN is typically also connected to the internet, but does not allow free access from the internet to client computers and servers belonging to the LAN or WAN. The connection to the internet is typically protected by a firewall, which is a hardware or software device between the LAN or WAN and the internet, which allows data traffic from computers belonging to and connected by the LAN or WAN to the internet, and generally blocks access from the internet to the LAN or WAN.

Generally, in embodiments a first data file, also called original file, is divided on the client computer of the user into at least two partial files, which may also be called "chunks". The partial files are encrypted on the client computer, resulting in encrypted partial files. The encrypted partial files are then distributed (also called: striped) over a network across at least two remote storage locations. The original, unencrypted partial files are typically deleted from the client computer. The first data file (original file) typically resides on the client computer. Thus, the remotely stored encrypted partial files are a backup of the original file, which adds security against data loss by way of redundancy. The remote storage locations are typically, but not necessarily part of remote storage services or cloud storage services, which are typically provided by commercial companies. One advantage of the remote storage methods, systems and software according to embodiments described herein is, that the original file is split and encrypted before it leaves the client computer of the user. This provides a high level of security in terms of limiting the number of possible weaknesses which might be used by an attacker. Once the encrypted partial files have left the client computer over the network adapter to the network, for example the internet, there is practically no chance for an attacker to retrieve access to the original file (first data file)—even if he can access a part, or even all of the encrypted partial files.

Optionally, the user may also choose to have the original file automatically deleted after encryption and distribution as described above, but in this case some options for later retrieval and file sharing are not accessible. Yet, as the original file in this case only remains in form of the remotely stored encrypted partial files, this is an option which provides even greater security against access of an unauthorized party to the original file, but does not provide the advantage of redundant file storage which was described above.

As the partial files are in embodiments distributed over at least two remote storage locations, the user files are secure even if an attacker compromises one remote storage location of one service provider, and/or breaks the encryption of user files stored online. In this case, he will only gain access to a fraction of the partial files stored with this particular remote storage location, and can thus not retrieve the original file, because other partial files stored elsewhere are missing. As the attacker typically does not know on which other remote storage locations the missing partial files are stored, he cannot access the original file even if he breaks the encryption of the partial files retrieved.

Due to splitting of the first data file into partial files first, files of nearly any size can be encrypted and uploaded via the provided method and system. Very large files, e.g. with a size of 2 Gigabytes or above, are often rejected by conventional services and are not suitable for most remote storage approaches, or are discouraged by terms of service of storage providers. When additional remote storage locations, or different providers of remote storage locations are added or removed, or offer more or less space, the software may redistribute encrypted partial files in order to, for example, eventually level utilization of each provider. This enhances the level of distribution of the partial files, enhancing security against attacks. The higher the number of partial files and the number of remote storage locations used for their storage, the more difficult it is for an attacker to retrieve the original file. The number of remote storage locations used, the minimum or maximum file size and the minimum number of partial files for each file may be chooseable by a user.

Figure 1:
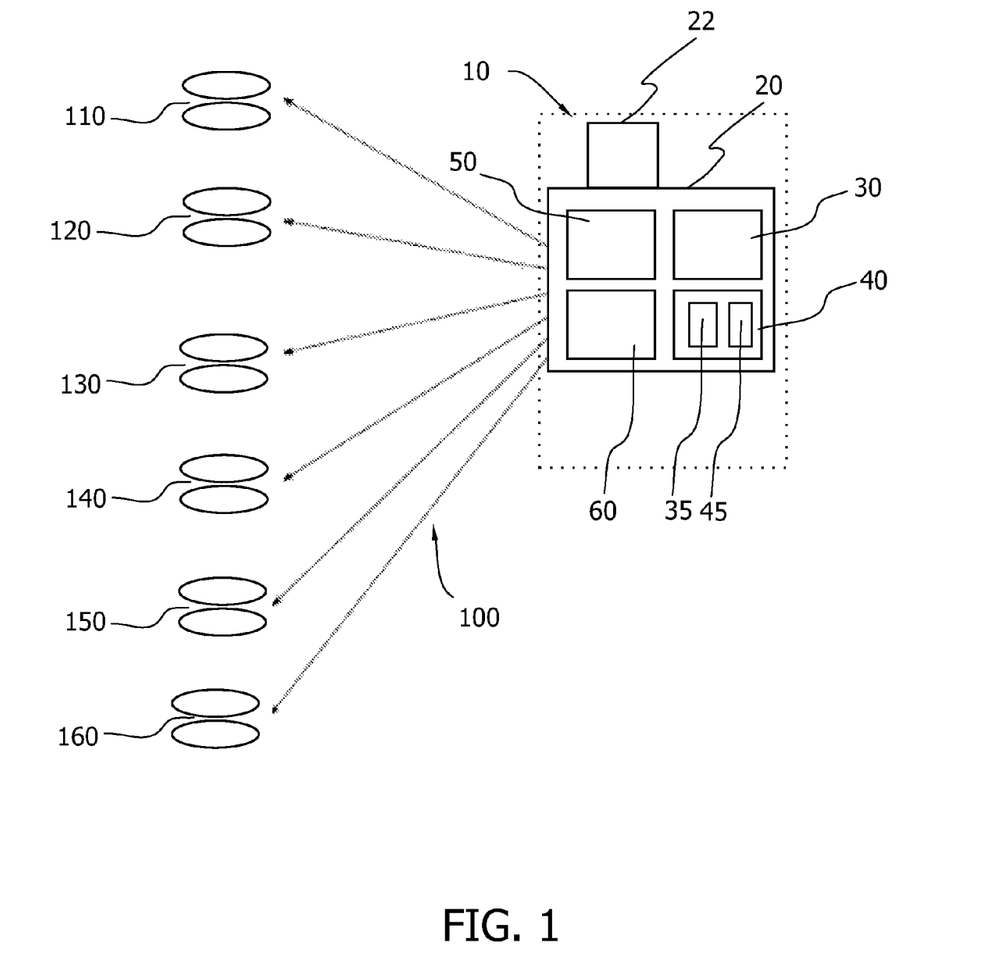
FIG. 1 is a schematic view of a computer system according to embodiments.

In FIG. 1, a computer system 10 according to embodiments is shown. With the computer system 10, data may be remotely stored. The data has the form of a file 45. A client computer 20 comprises a central processing unit 30, a storage device 40, a device for inputting data by a user 50, and a network adapter 60 for connecting the client computer 20 to a network 100. On the client computer, a software 35 according to embodiments is stored in the storage device 40, which when executed on the central processing unit 30 of the client computer serves for distributed and encrypted storage of a file over the network 100 in at least two remote storage locations 110, 120, 130, 140, 150, 160. The data to be encrypted and stored is typically a first data file 45, which is initially stored on the storage device 40. The software 35 is executable on the central processing unit 30 of the client computer 20. The software also produces output data for display to a user which is shown on a screen 22 of the client computer 20, and may receive input from a user via the device for inputting data by a user 50, which may typically be at least one of a keyboard, a touchscreen, a virtual keyboard displayed on the screen 22, a computer mouse, a data glove, or a trackball. When executed, the software 35 causes the client computer 20 to perform the following method 200 (see also FIG. 3) according to embodiments: The original file or first data file 45 is split into a plurality of partial data files or chunks, the minimum number of partial files being two. The at least two partial data files are encrypted with an encryption algorithm, resulting in encrypted partial files. The at least two partial data files are then distributed over the network 100 to at least two remote storage locations 110, 120, 130, 140, 150, 160 connected over the network. The client computer stores the information about where exactly the partial files are stored on the storage device 40. This information about the remote storage location of the at least two partial files is stored for a later retrieval of the at least two encrypted partial files (the retrieval information). Further, information about the encryption algorithm, a cryptographic key employed and optionally a passphrase are also stored locally on the storage device 40 (the decryption information). These two types of information can be used to retrieve the first data file 45 from the remotely stored encrypted partial files at a later stage.

The remote storage locations 110, 120, 130, 140, 150, 160 may in embodiments be commercial remote storage services. The internet addresses and the respective account information and passphrases, herein called access information, are typically stored on the storage device 40 by the software 35. They may be provided by the vendor of the software 35 and may be hard-coded in the software 35, or may typically be stored in a form such that the information may be updated by the software vendor. Also, the software 35 may be configured in embodiments such that the user can edit the information about possible remote storage locations on his own. Hence, he may add providers of storage space which are accessible over, for example, the FTP protocol or the WEBDAV protocol, and may so increase both his available amount of storage, and increase overall security by adding additional remote storage locations. The more remote storage locations are used for the storage of the encrypted partial files, or the more partial files for each original file are used, the more difficult it is for an attacker to retrieve the original file.

The software 35 is typically configured to regularly check if the remote storage locations 110, 120, 130, 140, 150, 160 used for the storage of the first data file 45 of the user are still online, that is, if they are currently available at the time of the test. If not, the software can look up in the retrieval information which partial files were stored with a remote storage location which is offline. The respective partial file is then temporarily considered as lost, and is again produced by splitting and encrypting the first data file 45 which is still stored on the client computer 20. The partial files considered as lost are then distributed to other remote storage locations determined as currently available.

Hence, if for example one of the used remote storage service providers encounters a catastrophic event, or even ceases to exist, the lost encrypted partial files can easily be redistributed in the background from the original file, that is the first data file 45. In embodiments, this can even happen automatically without the user noticing, depending on the configuration of the software 35. The user may however receive a notice from the software 35 that one of the remote storage locations seems not to be working currently, or stopped working at a certain time.

The cryptographic algorithm employed in the encryption of the partial files according to embodiments is typically an algorithm which is known to provide high security against attacks. The encryption algorithm may typically be a block cipher. It may make use, for additional safety, of a passphrase chosen by the user, which is typically not stored on the client computer 20. Possible algorithms are, as non-limiting examples, AES-128, AES-192, or AES-256. After encryption, the encrypted partial files are cryptographically signed, for example using the RSA algorithm. As cryptographic algorithms are generally known to be broken after some years of usage and with growing computing power over time, the employed algorithm shall not be given too much attention in this disclosure. Generally, any cryptographic method or algorithm may be employed in embodiments which are suitable for encrypting data files. Thereby, the algorithm may make or may not make use of cryptographic keys and passphrases. The software 35 may also be configured to offer more than one type of encryption algorithm, between which a user can choose depending on his security needs. Also, more than one type of algorithm may be combined, or an algorithm may be employed n times, wherein n is an integer greater than 1 and is chosen by the user to further enhance security.

The software 35 can have a number of built-in security features and mechanisms according to embodiments, which may be realized and activated individually, in combinations or together, and which may for example be individually activated or deactivated by a user, typically over a user interface of the software 35.

For enhancing security and ease of use, the parameters of the distribution of the encrypted partial files on the remote storage locations 110, 120, 130, 140, 150, 160 may be carried out using an algorithm which takes into account properties of the first data file 45. In embodiments, this or these algorithms can be included in the software 35.

The manner of distribution of the at least two encrypted partial files on the at least two remote storage locations 110, 120, 130, 140, 150, 160 may be dependent on a variety of parameters. For example, the access frequency on the first data file on the client computer 20 in a past predefined time-span may be determined. The background is that most files are updated often during a short period after creation or their first use, and then sit untouched in a file system for a long time. Thus, the software can take into account the last change date, and if the file is younger, larger partial files are distributed. Also, a frequently used file may be stored primarily on remote storage location for which it was determined that they have shorter access times than other remote storage locations used. Also, the number of different users who have accessed the first data file in a past predefined time-span may be taken into account, also employing the above methods for access optimization. Further, a type of file may be taken into account. For example, text files for a word processor program may be stored to have lower access time, as they tend to be used and reworked more often than other file types. Also, the software 35 may consider the geographical distance in which a remote storage location is located, as greater distances may tend to cause longer latency times and slower transmission, in particular across continents. Thus, larger files may for example rather be stored in locations which are closer to the client computer or in the same country, if that information is available.

Generally, the software 35 is configured in embodiments to split the first data file 45 into a minimum number of partial files, regardless of the original file size. The minimum number may be from 2 to 100, more typically from 5 to 20. It typically has an internal list of potential remote storage locations which can be used by the software 35. The number of partial files created can typically be from 2 to 50, more typically from 5 to 30, and also larger numbers are possible. The number of created partial files may be dependent on the size of the original file, or it can be predetermined by a user into how many partial files the first data file 35 is split at minimum, and/or what the minimum or maximum size for each partial file is. In embodiments, the software 35 is configured such that a user can set his own security confidence level for each original file. This is used by the software to calculate the minimum size of the partial files and the number of remote storage locations needed to meet this security confidence level.

Figure 2:
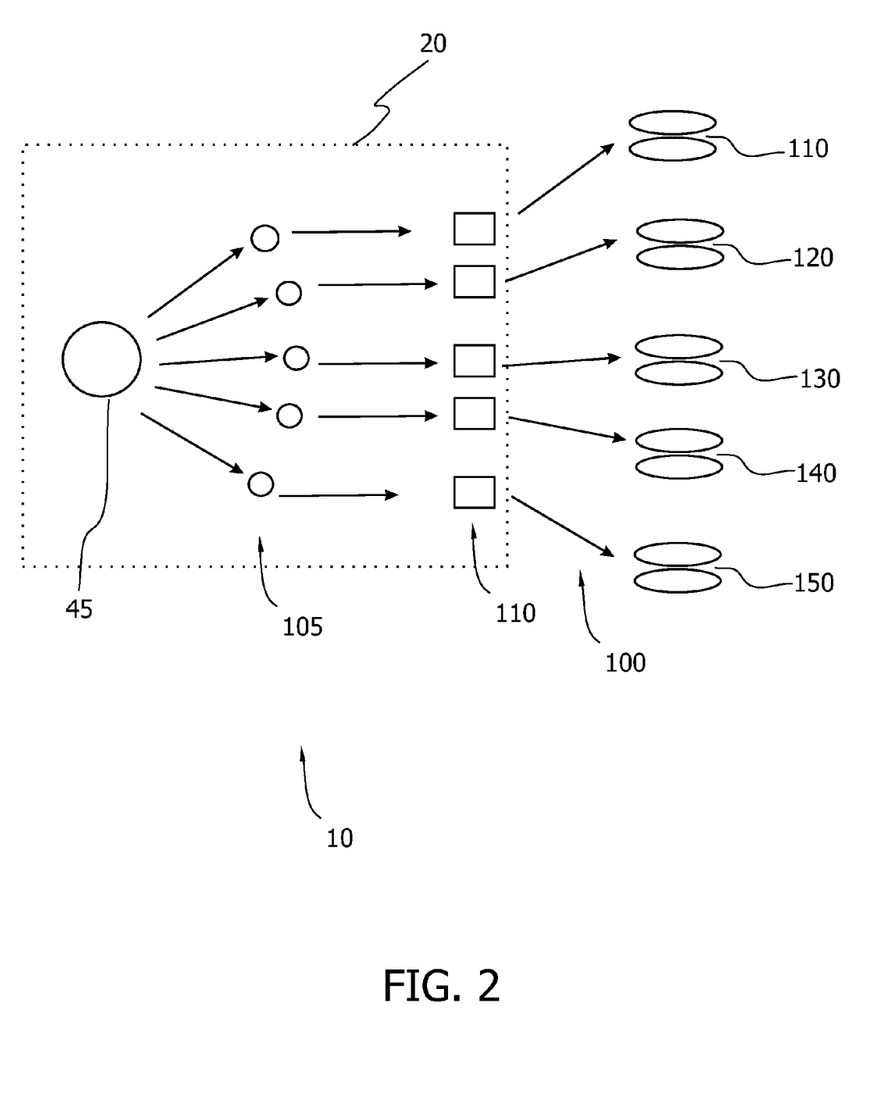
FIG. 2 is a schematic view of the encryption and storage of a file according to embodiments.

In FIG. 2, the method for remotely storing data according to embodiments is schematically shown. The first data file 45, stored on the client computer 20, is first split into a number of partial files 105, the number of which is five, only for illustrational purposes, in FIG. 2. These partial files 105 are then encrypted, and an equal number of encrypted partial files 110 results. Until this point, the method is carried out entirely on the client computer 20, using a software 35 stored thereon. The encrypted partial files 110 are then distributed over network 100 to the remote storage locations 110, 120, 130, 140, 150. The number of remote storage locations is typically smaller than the number of partial files, however in FIG. 2 the number of remote storage locations

110, 120, 130, 140, 150 is equal to the number of partial files 105 for illustrational purposes only.

Figure 3:
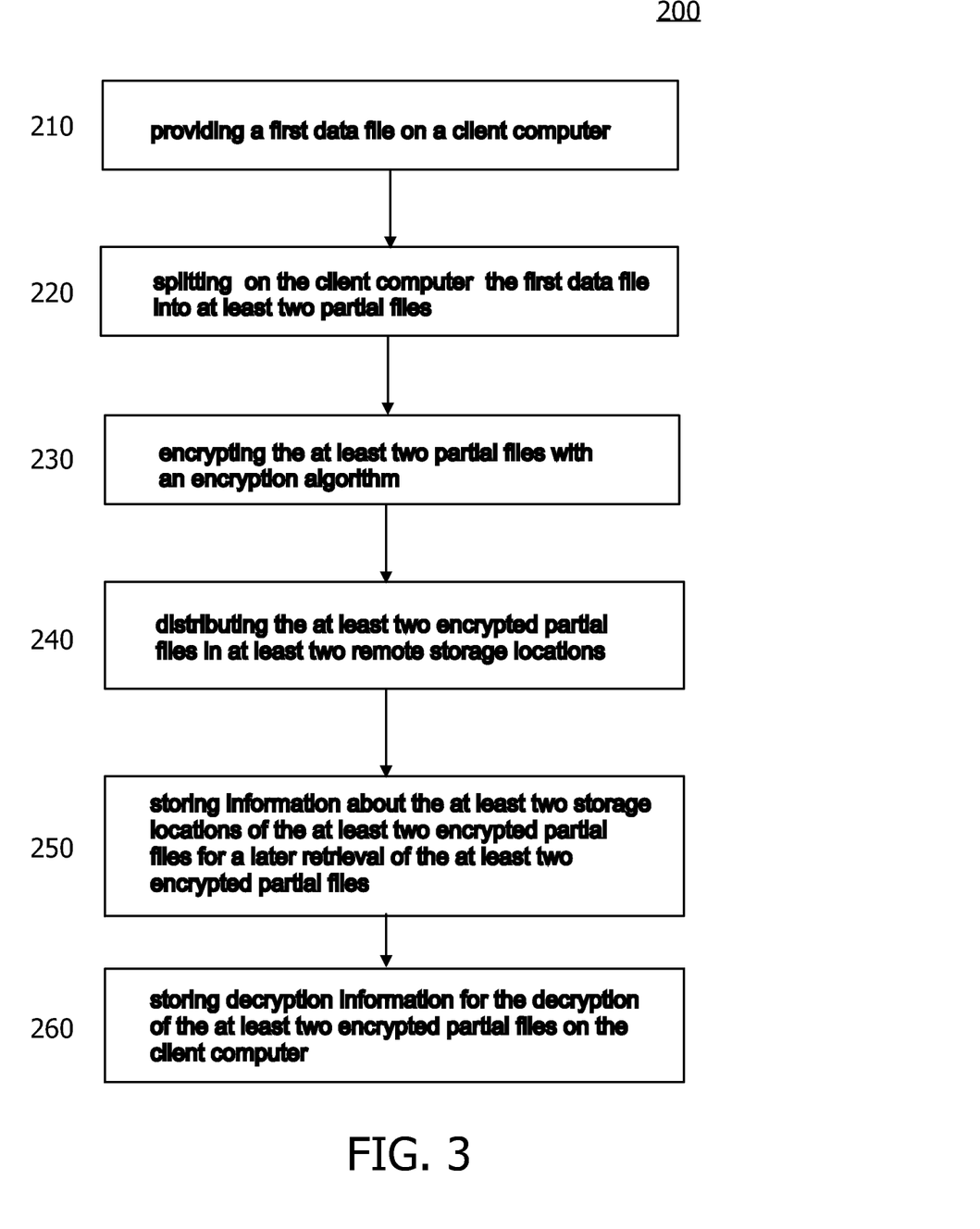
FIG. 3 is a schematic view of a method according to embodiments.

FIG. 3 schematically shows a method 200 for remotely storing data according to embodiments. The method 200 comprises: Providing a first data file 45 on a client computer 20, in a block 210; splitting, on the client computer 20, the first data file 45 into at least two partial files 105, in a block 220; encrypting the at least two partial files 105 with an encryption algorithm in a block 230; distributing the at least two encrypted partial files 110 in at least two remote storage locations 110, 120, 130, 140, 150, 160, in a block 240; storing information, on the client computer 20, about the at least two storage locations 110, 120, 130, 140, 150, 160 of the at least two encrypted partial files 110 for a later retrieval of the at least two encrypted partial files, in a block 250; storing decryption information for the decryption of the at least two encrypted partial files 110 on the client computer 20, in a block 260. Generally, in embodiments, the method 200 is performed on a client computer 20. To this end, a software 35 comprising instructions is provided, which when executed on a computer, more precisely on the client computer 20, forces the client computer to perform method 200. The software 35 is typically stored on a storage device 40 of the client computer. The client computer 20 and the software 35 together form computer system 10 for executing the method 200. Embodiments pertain also to a computer readable medium storing computer executable instructions that, when executed on the central processing unit 30 (short: processor) of the client computer 20, force the client computer 20 to perform the method 200. The computer executable instructions are identical to the software 35.

The software 35 may in embodiments choose from a list of available providers and/or locations which remote storage locations to employ for the storage of the encrypted partial files of a first data file. Thereby, it can for example be configured to prefer locations which had the best availability and/or response time (ping time) and/or access data rate (read/write performance) over a defined time-span in the past, for example in the last week or month. Also, the distribution of the partial files on the various remote storage locations may typically be oriented on the percentage of available storage space on each remote storage location, in order to avoid reaching a storage quota during storing.

In embodiments, the software frequently and/or randomly and/or on request by a user checks if all partial files of the first data file 35 are available on the remote storage locations employed for the partial files of a certain first data file 35. When an amount of available storage space changes on at least one of the remote storage locations, or when a new remote storage location is added, the software 35 may in embodiments be configured to automatically redistribute partial files between remote storage locations, in order to enhance the number of different storage locations for enhanced security.

In embodiments, the first data file may additionally be encrypted with an encryption algorithm prior to splitting the first data file 45 into partial files. By doing so, the security against cryptographic attacks, using cryptanalysis, is further enhanced. A further option to enhance security is to store at least a part of the decryption information for the decryption of the encrypted partial files of an original file in at least one further storage location different from the storage device on the client computer 20, and different from the remote storage locations. This may for example be a smartphone of a user, or an email account provided by the user, or a further client computer. This adds obfuscation, because even if an attacker were to gain access to the client computer, he would not be able to retrieve the first data file, as he misses retrieval and/or decryption information.

In embodiments, corporations can add an additional layer of security by placing one or more self-managed remote storage services behind their firewalls. That is, at least one remote storage location is protected from access from the internet within its own LAN or WAN. Also, users can open space on their hard drives for the storage of partial files of friends and vice versa, essentially avoiding the need of a commercial storage service provider altogether. Larger institutions such as corporations can use the same mechanism for long term storage of sensitive files on employees' client computers.

In embodiments, the methods and software according to embodiments may be employed to enable secure file sharing between a plurality of users, respectively between the client computers of the users. To this end, the partial files originating from the original file to be shared are newly encrypted on the client computer 20 with a new encryption key. This encryption key is then signed with the public key of a peer user which shall receive the file(s). The newly encrypted partial files are then transmitted to the peer via a peer-to-peer algorithm or via a server, for example using FTP or Webday. The employed keys may be RSA keys.

Further, the software may include report and analysis functionality, which provides a user with data such as: number of accesses from peers to a remote file, revision events for the change of a file by a peer, the general usage of storage and storage quotas, and on the distribution of partial files, including the respective level of security.

In embodiments, further measures may be employed to enhance the security of the method and software even further, which is for example relevant for high security applications or the handling of highly sensitive financial data. For example, at least a part of the method 200, embodied in the software 35, may be carried out in a sandbox environment on the client computer. This further prevents intrusion by a third party, even if that party would gain access to the client computer 20.

In embodiments, a passphrase used in the encryption of the partial files 105 and/or additionally in the encryption of the first data file 45 may be put in by the user using a virtual keyboard displayed on the screen 22 of the client computer 20. The virtual keyboard is operable with a computer mouse, for example. This prevents against so called keyloggers, for example. Additionally or alternatively, the encryption process may be configured in the software 35 for using encryption data provided by, or obtained through, an external hardware device (not shown) connected to the client computer—preferably comprising at least one of a card reader, a token reader, an ID reader, a keyboard, or a biometric identification device.

In embodiments, the manner of distribution of the at least two partial files on the at least two remote storage locations is carried out using an algorithm which determines and takes into account at least one of the following parameters: the access frequency on the first data file on the client computer in a past predefined time-span; the number of different users who have accessed the first data file in a past predefined time-span, the type of the file, the size of the file, the determined percentage of accessibility of the at least two remote storage locations; the determined write/read performance of the at least two remote storage locations, or the degree to which a maximum storage amount on each of the at least two remote storage locations is used; an individual security level which is chosen by a user for the first data file prior to the splitting.

In embodiments, the encryption of the at least two partial files can be carried out using one or more from a plurality of encryption algorithms, which can optionally be chosen by a user.

In embodiments, encryption of the at least two partial files is carried out by applying the encryption algorithm(s) n times, wherein n can optionally be chosen by a user from 1 to a predetermined number.

In embodiments, it can be predetermined, preferably by a user, into how many partial files the first data file is split at minimum, and/or what the maximum size for each partial file is.

In embodiments, a software 35 frequently and/or randomly and/or on request by a user checks if all partial files of the first data file are available on the at least two remote storage locations. If some are not available, the partial file(s) which is not currently available is redistributed to a different one of the at least two remote storage locations.

In embodiments, after splitting the first data file, a number of additional dummy partial files are generated by the software. In order to make such dummy partial files look like meaningful data to a potential attacker, they can be generated by taking or merging fragments of real existing files, for example randomly downloaded from random internet-websites, or from files from a pool of files regarded as having lowest secrecy, which are to this purpose chosen or predefined by a user. The generation of dummy partial files is done preferably prior to the encryption. The number of generated dummy partial files may vary and may make up from about 5 percent to about 95 percent of the number of all partial files, more preferably form 10 percent to 80 percent, or the combined size of all dummy partial files may make up from about 5 percent to about 95 percent of the size of all combined partial files, more preferably form 10 percent to 80 percent. A user may preferably determine the respective percentage before the encryption of the partial files. This adds obfuscation and makes it more difficult for an attacker, as he cannot easily identify which partial files are dummy files, as after encryption all the partial files are encrypted, which further enhances security. Thereby, the size of at least one dummy partial file and/or the size of a combination of dummy partial files may represent a code, to further add obfuscation by providing misguiding information.

In embodiments, the first data file may be integrated (in a hidden manner not obvious to an observer) in another file which has the function of a carrier, for example a video file or picture. This method is principally known as steganography and adds a further level of security. Additionally or alternatively, the partial files may, all or partially, be integrated in a carrier file each, prior to encryption. This adds even more security, as an attacker, if at all, will see the carrier file after a successful attack, and not the real file hidden therein.

In embodiments, at least a part of the method may be carried out in a sandbox environment on the client computer, to prevent intrusion by a third party. Further, a passphrase used in the encryption of the partial files and/or additionally in the encryption of the first data file may be put in by the user using a virtual keyboard on a screen of the client computer. Further, the encryption process may use encryption data provided by or obtained through an external hardware device, which is connected to the client computer. This may be, as non-limiting examples only, a card reader, a token reader, an ID reader, a keyboard, or a biometric identification device.

In embodiments, a user may predetermine a level of security, as a non-limiting example from 1 to 5 in integer steps (5 being highest security), prior to executing the method on a first data file. This influences at least one of: the number of partial files into which the first data file is split; the number of times with which at least one encryption algorithm is employed on each partial file; the number of different remote storage locations onto which the partial files are distributed; the choice of the at least two remote storage locations onto which the partial files are distributed, whereby the remote storage locations used are chosen according to their geographical location, and wherein preferably the number of countries is maximized; or minimizing the use of, or excluding entirely remote storage locations in predefined countries regarded to provide less privacy; or to which percentage of number or size dummy partial files are added to the partial files.

Generally, it is understood that all methods, processes and algorithms described herein can typically be embodied in computer software comprising instructions, which can be run on a client computer, which is thereby forced to perform the methods disclosed herein. Generally, all method and variants described herein with respect to embodiments can be realized as software, according to embodiments, executable on any type of client computer. The terms "software" and "method" are sometimes used interchangeably herein. The computer software is typically stored on a storage device of the client computer, typically a hard disc. The software may also be stored on other computer readable media, such as CD ROMS, DVDs, USB sticks, memory cards, or the like, or may be available as a download from the internet, particularly from a server.

Exemplary embodiments of systems and methods for remotely storing data are described above in detail. The systems and methods are not limited to the specific embodiments described herein, but rather, components of the systems and/or steps of the methods may be utilized independently and separately from other components and/or steps described herein. For example, systems and methods described are not limited to practice with only the cryptographic algorithms as described herein. Rather, the exemplary embodiment can be implemented and utilized in connection with many other cryptographic applications.

Although specific features of various embodiments of the invention may be shown in some drawings and not in others, this is for convenience only. In accordance with the principles of the invention, any feature of a drawing may be referenced and/or claimed in combination with any feature of any other drawing.

The present invention has been described in relation to particular embodiments, which are intended in all respects to be illustrative rather than restrictive. Alternative embodiments will become apparent to those of ordinary skill in the art to which the present invention pertains without departing from its scope. From the foregoing, it will be seen that this invention is one well adapted to attain all the ends and objects set forth above, together with other advantages which are obvious and inherent to the methods. It will be understood that certain features and sub-combinations are of utility and may be employed without reference to other features and sub-combinations. This is contemplated by and is within the scope of the claims.

What is claimed is:

1. A method for remotely storing data, comprising:
   splitting, on a client computer, a first data file, stored on the client computer, into at least two partial files;
   encrypting the at least two partial files with at least one encryption algorithm;
   distributing the at least two encrypted partial files to at least two remote storage locations, wherein at least one of the at least two remote storage locations is an internet-based cloud storage service;
   storing information, on the client computer, about the at least two storage locations of the at least two encrypted partial files for a later retrieval of the at least two encrypted partial files;
   storing decryption information for the decryption of the at least two encrypted partial files on the client computer;
   redistributing partial files between the at least two remote storage locations when an amount of available storage space is changed on at least one of the remote storage locations, or when a new remote storage location is added;
   generating at least one dummy file; and
   obfuscating, before the encrypting, the at least two partial files with the at least one dummy file,
   wherein the number of the at least one dummy file makes up a percentage from 5 percent to 95 percent of the number of the at least two partial files, or wherein a combined size of the at least one dummy file makes up a percentage from 5 percent to 95 percent of the size of the at least two partial files, and
   wherein the percentage used is determined and received as input before the encryption of the partial files.

2. The method of claim 1, wherein the distribution of the at least two partial files on the at least two remote storage locations is carried out using an algorithm which takes into account properties of the first data file.

3. The method of claim 1, wherein the distribution of the at least two partial files on the at least two remote storage locations is carried out using an algorithm which determines and takes into account at least one of the following parameters:
   a. an access frequency on the first data file on the client computer in a past predefined time-span,
   b. a number of different users who have accessed the first data file in a past predefined time-span,
   c. a type of the file,
   d. a size of the file,
   e. a determined percentage of accessibility of the at least two remote storage locations,
   f. a determined write/read performance of the at least two remote storage locations, or
   g. a degree to which a maximum storage amount on each of the at least two remote storage locations is used,
   h. an individual security level received as input from a user for the first data file prior to the splitting.

4. The method of claim 1, wherein the encryption of the at least two partial files can be carried out using one or more from a plurality of encryption algorithms, which can optionally be received as input from a user.

5. The method of claim 1, wherein the encryption of the at least two partial files is carried out by applying the encryption algorithm(s) n times, wherein n can optionally be received as input from a user from 1 to a predetermined number.

6. The method of claim 1, wherein it can be predetermined into how many partial files the first data file is split at minimum, and/or what the maximum size for each partial file is.

7. The method of claim 1, further including checking, at least one of frequently, randomly, or by a received request from a user, if all partial files of the first data file are available on the at least two remote storage locations, and redistributing a partial file which is not currently available to a different one of the at least two remote storage locations.

8. The method of claim 1, wherein the size of a dummy partial file and/or the size of a combination of dummy partial files represent a code, to add obfuscation.

9. The method of claim 1, further comprising:
   encrypting the first data file with an encryption algorithm, prior to splitting the first data file into at least two partial files.

10. The method of claim 1, further comprising storing at least a part of the decryption information for the decryption of the at least two encrypted partial files in at least one storage location other than the client computer and the at least two remote storage locations.

11. The method of claim 1, wherein at least a part of the at least two remote storage locations are other computers in a community of computer users, which is a web of trust with defined procedures for joining which are included as executable software on the client computer.

12. The method of claim 1, wherein the encryption algorithm is a block cipher, employs a passphrase received as input by a user, and comprises at least one of AES-128, AES-192, or AES-256, and wherein the at least two partial files are cryptographically signed after encryption using RSA.

13. The method of claim 1, further including at least one of the following:
   a. at least a part of the method is carried out in a sandbox environment on the client computer to prevent intrusion by a third party,
   b. a passphrase used in the encryption of the partial files and/or additionally in the encryption of the first data file is received from the user using a virtual keyboard on a screen of the client computer, or
   c. the encryption process uses encryption data provided by or obtained through an external hardware device connected to the client computer, comprising at least one of a card reader, a token reader, an ID reader, a keyboard, or a biometric identification device.

14. The method of claim 1, wherein the encryption algorithm employs at least one key.

15. The method of claim 1, further including determining a level of security associated with the first data file, wherein the level of security is used to determine at least one of:
   a. a number of partial files into which the first data file is split,
   b. a number of times with which at least one encryption algorithm is employed on each partial file,
   c. a number of different remote storage locations onto which the partial files are distributed,
   d. a choice of the at least two remote storage locations onto which the partial files are distributed, whereby the remote storage locations used are chosen according to their geographical location, and wherein the number of countries is maximized, or
   e. an amount of usage of remote storage locations in predefined countries regarded to provide less privacy.

16. The method of claim 1, further including peer-to-peer file sharing of files between different client computers, comprising:
- a. partial files to be shared are newly encrypted on the client computer with a new key,
- b. the new key is signed with a public key of a peer, and
- c. partial files are transmitted to the peer via a peer-to-peer algorithm or via a server, wherein the new and the public keys are RSA keys.

17. One or more non-transitory computer readable media storing computer executable instructions that, when executed on a processor, perform a method comprising:

splitting, on a client computer, a first data file, stored on the client computer, into at least two partial files;

encrypting the at least two partial files with at least one encryption algorithm;

distributing the at least two encrypted partial files in at least two remote storage locations, wherein at least one of the at least two remote storage locations is an internet-based cloud storage service;

storing information, on the client computer, about the at least two storage locations of the at least two encrypted partial files for a later retrieval of the at least two encrypted partial files;

storing decryption information for the decryption of the at least two encrypted partial files on the client computer;

redistributing partial files between the at least two remote storage locations when an amount of available storage space is changed on at least one of the remote storage locations, or when a new remote storage location is added;

generating at least one dummy file; and obfuscating, before the encrypting, the at least two partial files with the at least one dummy file, wherein the number of the at least one dummy file makes up a percentage from 5 percent to 95 percent of the number of the at least two partial files, or wherein a combined size of the at least one dummy file makes up a percentage from 5 percent to 95 percent of the size of the at least two partial files, and wherein the percentage used is determined and received as input before the encryption of the partial files.

18. A computer system for remotely storing data, comprising:

- a. a client computer, comprising a central processing unit, a storage device, a device for receiving data input by a user, a screen, and a network adapter for connecting the client computer to a network,
- b. a software for the distributed and encrypted storage of data over a network in at least two remote storage locations, wherein the software is executable on the client computer and comprises processes for:
    - i. splitting, on the client computer, a first data file to be stored into at least two partial data files,
    - ii. encrypting the at least two partial data files with at least one encryption algorithm,
    - iii. distributing the at least two partial data files over at least two remote storage locations connected over a network, wherein at least one of the at least two remote storage locations is an internet-based cloud storage service,
    - iv. storing information, on the client computer, about the at least two storage locations of the at least two partial files for a later retrieval of the at least two partial files,
    - v. storing decryption information, on the client computer, for the decryption of the at least two partial files,
    - vi. redistributing partial files between the at least two remote storage locations when an amount of available storage space is changed on at least one of the remote storage locations, or when a new remote storage location is added,
    - vii. generating at least one dummy file; and
    - viii. obfuscating, before the encrypting, the at least two partial files with the at least one dummy file,
        wherein the number of the at least one dummy file makes up a percentage from 5 percent to 95 percent of the number of the at least two partial files, or wherein a combined size of the at least one dummy file makes up a percentage from 5 percent to 95 percent of the size of the at least two partial files, and wherein the percentage used is determined and received as input before the encryption of the partial files.

* * * * *